Jan. 5, 1954  J. L. SALVATORA  2,665,179
PISTON FOR HYDRAULIC BRAKES
Filed July 8, 1950
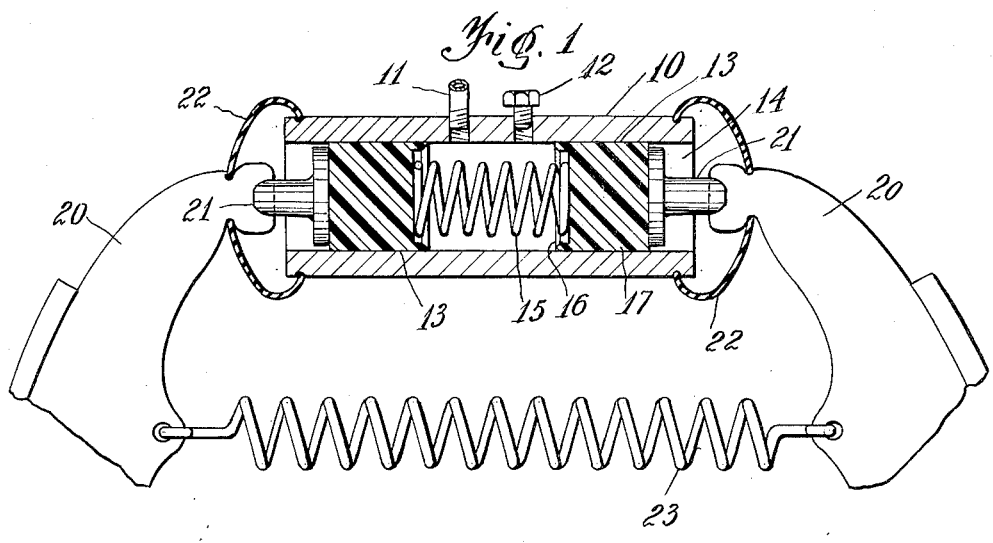
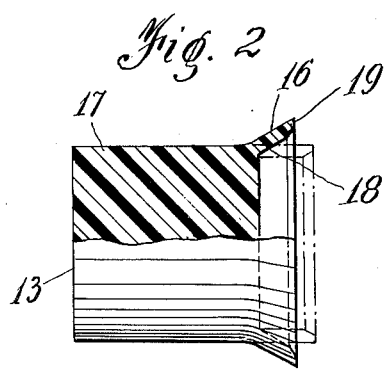  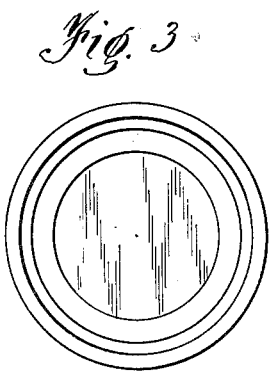
Joseph L. Salvatora,
INVENTOR.
BY Ralph Donath
Attorney.

Patented Jan. 5, 1954

2,665,179

UNITED STATES PATENT OFFICE 2,665,179

PISTON FOR HYDRAULIC BRAKES

Joseph L. Salvatora, Pittsburgh, Pa., assignor to Richard G. Ellas, Jennerstown, Pa.

Application July 8, 1950, Serial No. 172,717

6 Claims. (Cl. 309—4)

This invention relates to a piston for a hydraulic device and more particularly for hydraulic cylinders such as used in hydraulic brake systems for automotive vehicles.

Pistons for hydraulic devices such as hydraulic brakes pistons have heretofore been made of flexible rubber or rubber compositions either surrounding a metallic core or backed up by a metallic piston, the rubber portion serving merely as the sealing medium and furnishing none of the body or supporting structure for the piston. Such pistons as have heretofore been proposed are not entirely satisfactory for various reasons. Since they are made up of several parts of different materials, they require many operations to form them that could be avoided if they were made in a single piece. Moreover, being made up of two pieces of different materials having different physical characteristics they tend to become separated in use and permit leakage of hydraulic fluid around the piston as well as being more difficult to install than a unitary piston. Again, the difference in frictional characteristics tends to cause the rubber facing to cling to the interior of the bore to a greater extent than the metallic backing element, thereby causing them to separate and permitting fluid leakage around the piston.

Fluid leakage in hydraulic systems, especially in hydraulic brake systems, is not only undesirable but dangerous. Hydraulic fluid leaking around the piston of a hydraulic brake cylinder may drop onto the brake lining causing it to grab and force the car to swerve or if sufficient fluid is lost it may fail to actuate the brakes at all. Such brake failures are not at all uncommon and are the cause of frequent costly accidents.

The device of this invention avoids all of these difficulties of the prior art devices by providing a unitary piston having the desirable properties of a resilient cup shaped head and a relatively non-deformable body of the multi-part devices but without their drawbacks.

This invention provides in general a piston for a hydraulic device having an internal piston receiving bore such as a brake cylinder or the like, comprising an integrally molded head and body of material which in thin section can be compressed, said head having a cup shaped depression therein with sloping sides forming with the external periphery of the head a tapered wall varying in thickness from a minimum at its external edge to a maximum at its junction with the body of the piston, said external edge having an outer perimeter not substantially less than the maximum perimeter of the piston body, and said body having a perimeter substantially equal to that of the internal perimeter of the piston bore and a length such that the combined head and body are prevented from turning in the piston bore about a line transverse to the axis of the piston bore.

Preferably the piston is made of a thermoplastic polyamide plastic such as the polyamide resins made by polymerization of a hexamethylenediamine salt of adipic acid and generally termed nylon or of polymerized tetrafluoroethylene commonly called teflon. The outer perimeter of the external edge of the head is preferably greater than the largest perimeter of the body and slopes to the junction of the head with the body, forming a short frustrum of a cone.

This invention will be more clearly understood by referring to the drawings in which:

Figure 1 is a section through a hydraulic brake cylinder incorporating the device of this invention.

Figure 2 is a partial section of a piston according to the invention, and

Figure 3 is an end elevation of the piston.

Referring to the drawings, there is illustrated in Figure 1 a wheel brake cylinder 10 such as is commonly used in automotive vehicles. A brake fluid line 11 from the master cylinder (not shown) enters the brake cylinder 10 intermediate its ends for delivery of fluid into the fluid receiving portion of the cylinder. A bleed screw 12 is provided adjacent the fluid line 11 for the removal of trapped air. The pistons 13 of this invention are shown inserted in the bore 14 of the wheel cylinder 10 and held in spaced relation by a spring 15 which acts to maintain a fluid receiving portion in the cylinder. Each of the pistons is made up of a head 16 and body 17 integrally formed of nylon plastic. The head 16 has a cup shaped depression 18 formed therein and an outer edge 19 having a diameter greater than the diameter of the body portion 17. This outer edge 19 has a narrower wall thickness than the portion of the head adjacent the body 17, so that the walls taper from a relatively thin section at their outer edge to a relatively thick section at their junction with the body 17. Each of the pistons is in contact with the end of a brake drum 20 either through an auxiliary bearing member 21 or by altering the shoe itself to have an integral bearing end (not shown).

Rubber dust caps 22 may be used on either end of the wheel cylinder to prevent dirt from entering the wheel cylinder. A return spring 23 may be used between the brake shoes 20 in order to return the brake shoes to the released position after use.

When installing the piston 13 of this invention, the external edge of the cup shaped portion is compressed and slid into the bore 14 of the wheel cylinder. The outer edge 19 thereupon expands and seals the space between the bore of the piston against the escape of fluid. It is important for the successful and efficient operation of this invention that the edge of the cup shaped head be thinner than the portion which adjoins the body of the piston in order that the proper wiping action take place against the internal wall of the bore.

While there is illustrated and described a particular embodiment of this invention it will be understood that it may be otherwise embodied within the scope of the following claims.

I claim:

1. A piston for a hydraulic device having an internal piston receiving bore such as a brake cylinder or the like comprising an integrally molded head and body of a polyamide plastic, said head having a cup shaped depression therein with sloping sides forming with the external periphery of the head a tapered wall varying in thickness from a minimum at its external edge to a maximum at its junction with the body of the piston, said external edge having an outer perimeter not less than the maximum perimeter of the piston body, and said piston body having a perimeter substantially equal to that of the internal perimeter of the piston bore and a length such that the combined head and body are prevented from turning in the piston bore about a line transverse to the axis of the piston bore.

2. A piston for a hydraulic device having an internal piston receiving bore such as a brake cylinder or the like comprising an integrally molded head and body of a polyamide plastic, said head having a cup shaped depression therein with sloping sides forming with the external periphery of the head a tapered wall varying in thickness from a minimum at its external edge to a maximum at its junction with the body of the piston, said external edge having an outer perimeter greater than the largest perimeter of the body and sloping to the junction of the head with the body, and said piston body having a perimeter substantially equal to that of the internal perimeter of the piston bore and having a length such that the combined head and body are prevented from turning in the piston bore about a line transverse to the axis of the piston bore.

3. A piston for a brake cylinder having a cylindrical piston receiving bore comprising an integrally molded head and body of a polyamide plastic, said head having a cup shaped depression therein with sloping walls forming with the external periphery of the head a tapered wall whose thickness varies from a minimum at its external edge to a maximum at its junction with the body of the piston, said external edge having an outer diameter not less than the largest diameter of the piston body and said piston body having a diameter substantially equal to the diameter of the piston bore and a length such that the combined head and body are prevented from turning about the diameter of the body in the bore.

4. A piston for a brake cylinder having a cylindrical piston receiving bore comprising an integrally molded head and body of a polyamide plastic, said head having a cup shaped depression therein with sloping side walls forming with the external periphery of the head a tapered wall whose thickness varies from a minimum at its external edge to a maximum at its junction with the body of the piston, said external edge having an outer diameter greater than the diameter of the body of the piston and said piston body having a diameter substantially equal to the diameter of the piston bore and a length such that the combined head and body are prevented from turning about the diameter of the head in the bore.

5. A piston for a brake cylinder having a cylindrical piston receiving bore comprising an integrally molded head and body of a plastic of the group consisting of polyamide plastics and polymerized tetrafluoroethylene, said head having a cup shaped depression therein with sloping walls forming with the external periphery of the head a tapered wall whose thickness varies from a minimum at its external edge to a maximum at its junction with the body of the piston, said external edge having an outer diameter not less than the largest diameter of the piston body and said piston body having a diameter substantially equal to the diameter of the piston bore and a length such that the combined head and body are prevented from turning about the diameter of the body in the bore.

6. A piston of the type claimed in claim 5 having a head and body of integrally molded polymerized tetrafluoroethylene.

JOSEPH L. SALVATORA.

References Cited in the file of this patent

UNITED STATES PATENTS

| Number | Name | Date |
|---|---|---|
| 2,029,367 | Geyer | Feb. 4, 1936 |
| 2,093,062 | Watson | Sept. 14, 1937 |
| 2,111,312 | Clark | Mar. 15, 1938 |
| 2,307,671 | Dodge | Jan. 5, 1943 |
| 2,315,944 | Dick | Apr. 6, 1943 |
| 2,349,345 | Goepfrich | May 23, 1944 |
| 2,387,181 | Proctor | Oct. 16, 1945 |
| 2,429,426 | Phillips et al. | Oct. 21, 1947 |
| 2,515,956 | Greenberg | July 18, 1950 |

OTHER REFERENCES

Molded and Machined Nylon, an article from "Product Engineering," December 1946, pages 103–107.

Schack, "A Manual of Plastics and Resins," 1950. Published by Chemical Publishing Company, Inc., Brooklyn, New York. Pages 314 and 447.